United States Patent [19]

Calundann

[11] 4,219,461

[45] Aug. 26, 1980

[54] POLYESTER OF 6-HYDROXY-2-NAPHTHOIC ACID, PARA-HYDROXY BENZOIC ACID, AROMATIC DIOL, AND AROMATIC DIACID CAPABLE OF READILY UNDERGOING MELT PROCESSING

[75] Inventor: Gordon W. Calundann, Somerset, N.J.

[73] Assignee: Celanese Corporation, New York, N.Y.

[21] Appl. No.: 32,086

[22] Filed: Apr. 23, 1979

Related U.S. Application Data

[63] Continuation-in-part of Ser. No. 843,993, Oct. 20, 1977, Pat. No. 4,161,470.

[51] Int. Cl.$^2$ .................... C08G 63/06; C08G 63/18
[52] U.S. Cl. .................... 260/40 P; 260/40 R; 528/173; 528/190
[58] Field of Search .............. 528/190, 173; 260/40 R

[56] References Cited

U.S. PATENT DOCUMENTS

| | | | |
|---|---|---|---|
| 4,067,852 | 1/1978 | Calundann | 528/190 |
| 4,083,829 | 4/1978 | Calundann et al. | 528/190 |
| 4,118,372 | 10/1978 | Schaefgen | 528/190 |

*Primary Examiner*—Lester L. Lee
*Attorney, Agent, or Firm*—Kenneth A. Genoni

[57] ABSTRACT

A novel polyester is provided which has been found to exhibit an optically anisotropic melt phase at a temperature which enables it readily to undergo melt processing to form quality fibers, molded articles, etc. The polyester of the present invention contains substantial concentrations of recurring 6-oxy-2-naphthoyl and p-oxybenzoyl moieties in addition to moieties derived from at least one aromatic diol and at least one aromatic diacid in the proportions indicated. The hydrogen atoms present upon the aromatic rings of these moieties optionally may be at least partially substituted (as described). The wholly aromatic polyester is capable of forming the desired anisotropic melt at a temperature below approximately 320° C., and in a particularly preferred embodiment at a temperature below approximately 300° C.

42 Claims, No Drawings

POLYESTER OF 6-HYDROXY-2-NAPHTHOIC ACID, PARA-HYDROXY BENZOIC ACID, AROMATIC DIOL, AND AROMATIC DIACID CAPABLE OF READILY UNDERGOING MELT PROCESSING

CROSS-REFERENCE TO RELATED APPLICATION

This is a continuation-in-part of commonly assigned U.S. Ser. No. 843,993, filed Oct. 20, 1977, now U.S. Pat. No. 4,161,470, issued July 17, 1979, by Gordon W. Calundann entitled "Polyester of 6-Hydroxy-2-Naphthoic Acid and Para-Hydroxy Benzoic Acid Capable of Readily Undergoing Melt Processing." The present application differs from that claimed in parent U.S. Ser. No. 843,993, filed Oct. 20, 1977, in that here it is contemplated that moieties (as defined) other than 6-oxy-2-naphthoyl and p-oxybenzoyl by necessity are present in the concentrations indicated.

BACKGROUND OF THE INVENTION

Wholly aromatic polyester resins long have been known. For instance, 4-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates* (*Polyesters From Aromatic Dicarboxylic Acids and Bisphenols*), by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems)-:Homopolymer for Coatings: Copolymers for Compression and Injection Molding*, by Roger S. Storm and Steven G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute. The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819; 2520820, and 2722120, (e) Japanese Pat. No. 43-223, (f) U.S. Pat. Nos. 3,991,013; 3,991,014; 4,057,597; 4,067,852; 4,075,262; 4,083,829; 4,118,372; 4,130,545; and 4,130,702. See also commonly assigned U.S. Ser. Nos. 843,993, filed Oct. 20, 1977; now U.S. Pat. No. 4,161,470 and 877,917 filed Feb. 15, 1978.

OBJECTS OF THE INVENTION

It is an object of the present invention to provide an improved melt processable wholly aromatic polyester which can commonly be formed on a more economical basis than that claimed in U.S. Ser. No. 843,993, filed Oct. 20, 1977 now U.S. Pat. No. 4,161,470.

It is an object of the present invention to provide an improved wholly aromatic polyester which is suited for the formation with ease of quality molded articles, melt extruded fibers, and melt extruded films.

It is an object of the present invention to provide an improved melt processable wholly aromatic polyester capable of forming an anisotropic melt phase at a temperature below approximately 320° C., and preferably below approximately 300° C.

It is an object of the present invention to provide an improved wholly aromatic polyester which forms a highly tractable melt phase.

It is an object of the present invention to provide an improved wholly aromatic polyester which forms an anisotropic melt phase at a temperature well below its decomposition temperature and which may form quality high performance fibers.

It is an object of the present invention to provide improved wholly aromatic polyester fibers which particularly are suited for use as fibrous reinforcement in a rubber matrix.

It is another object of the present invention to provide an improved wholly aromatic polyester which readily may be melt extruded to form a film.

It is another object of the present invention to provide an improved wholly aromatic polyester which readily may be injection molded to form a molded article (which optionally may be fiber reinforced) exhibiting superior tensile strength, flex strength, and impact strength.

These and other objects, as well as the scope, nature and utilization of the invention will be apparent to those skilled in the art from the following detailed description.

SUMMARY OF THE INVENTION

It has been found that a melt processable wholly aromatic polyester capable of forming an anisotropic melt phase at a temperature below approximately 320° C. consists essentially of the recurring moieties I, II, III, and IV which may include substitution of at least some of the hydrogen atoms present upon an aromatic ring wherein:

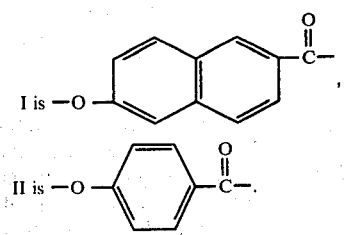

III is a symmetrical dioxy aryl moiety of the formula +[O—Ar—O]+ where Ar is a divalent radical comprising at least one aromatic ring, and IV is a symmetrical dicarboxy aryl moiety of the formula

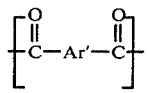

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 20 to 40 mole percent of moiety I, approximately 10 to 50 mole percent of moiety II, in excess of 5 up to approximately 30 mole percent of moiety III, and in excess of 5 up to approximately 30 mole percent of moiety IV.

DESCRIPTION OF PREFERRED EMBODIMENTS

The wholly aromatic polyester of the present invention consists essentially of at least four recurring moieties which when combined in the polyester have been found to form an atypical optically anisotropic melt phase at a temperature below approximately 320° C., and preferably below approximately 300° C. (e.g. at approximately 270° to 280° C.). Such aromatic polyester in most but not all embodiments of the present invention is crystalline in nature. The polymer melting temperatures may be confirmed by the use of a differential scanning calorimeter (i.e. DSC) employing repeat scans at a 20° C. per minute heat-up rate and observing the peak of the DSC melt transition. The crystalline polyester commonly exhibits a melting point of at least 250° C. and preferably of at least 260° C. as determined by differential scanning calorimetry. Because of its ability to exhibit anisotropic properties (i.e. liquid crystalline properties) in the melt, the polyester readily can form a product having a highly oriented molecular structure upon melt processing. Preferred polyesters are capable of undergoing melt processing at a temperature in the range of approximately 280° to 300° C. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The wholly aromatic polyester comprises four essential moieties. Moiety I can be termed a 6-oxy-2-naphthoyl moiety and possesses the structural formula:

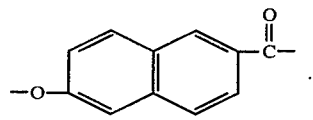

While not specifically illustrated in the structural formula, at least some of the hydrogen atoms present upon the aromatic rings of moiety I may be substituted. Such optional substitution may be an alkyl group of 1 to 4 carbon atoms, an alkoxy group of 1 to 4 carbon atoms, halogen (e.g. Cl, Br, I), and mixtures of the foregoing.

Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-4,7-dichloro-2-naphthoic acid, etc. The presence of ring substitution tends to modify to some degree the physical properties of the resulting polymer (e.g. the polymer may soften at a lower temperature, its impact strength may be improved, and the crystallinity of the solid polymer may be decreased). In a preferred embodiment wherein a polyester of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I comprises approximately 20 to 40 mole percent of the wholly aromatic polyester. In a preferred embodiment moiety I is present in a concentration of approximately 20 to 30 mole percent, and most preferably in a concentration of approximately 25 mole percent.

The second essential moiety (i.e. moiety II) can be termed a p-oxybenzoyl moiety and possesses the structural formula:

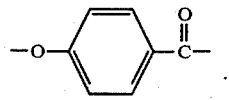

While not specifically illustrated in the structural formula, at least some of the hydrogen atoms present upon the aromatic ring of moiety II may be substituted. Such optional substitution may be an alkyl group of 1 to 4 carbon atoms, an alkoxy group of 1 to 4 carbon atoms, halogen (e.g. Cl, Br, I), and mixtures of the foregoing, Representative examples of ring substituted compounds from which moiety II can be derived include 3-chloro-4-hydroxy benzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, etc. The presence of ring substitution in moiety II tends to modify to some degree the physical properties of the resulting polymer as previously described in connection with moiety I. In a preferred embodiment wherein a polyester of optimum crystallinity in the solid state is desired, no ring substitution is present. For instance, moiety II is then derived from unsubstituted p-hydroxy benzoic acid or its derivatives.

Moiety II comprises approximately 10 to 50 mole percent of the wholly aromatic polyester. In a preferred embodiment moiety II is present in a concentration of approximately 25 to 40 mole percent, and most preferably in a concentration of approximately 35 mole percent.

The third essential moiety (i.e. moiety III) is a symmetrical dioxy aryl moiety of the formula ${-}{\mathrm{[O-Ar-O]-}}$ where Ar is a divalent radical comprising at least one aromatic ring. Moiety III is symmetrical in the sense that the divalent bonds which join the moiety to other moieties in the main polymer chain are symmetrically disposed on one or more aromatic rings (e.g. are para to each other or diagonally disposed when present on a naphthalene ring). Moiety III comprises in excess of 5 up to approximately 30 mole percent of the aromatic polyester, and preferably approximately 15 to 25 mole percent, and most preferably approximately 20 mole percent. Preferred moieties which may serve as the symmetrical dioxy aryl moiety in the aromatic polyester of the present invention include:

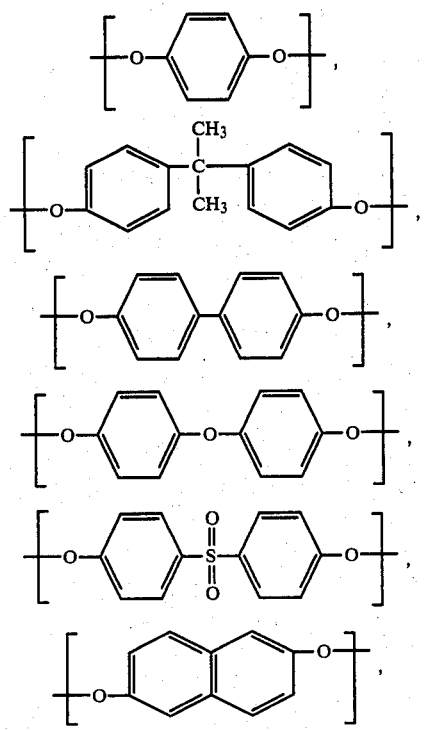

and mixtures of the foregoing.

The particularly preferred symmetrical dioxy aryl moiety is:

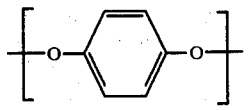

which readily may be derived from hydroquinone. Representative examples of ring substituted compounds from which moiety III can be derived include methylhydroquinone, chlorohydroquinone, and bromohydroquinone.

The fourth essential moiety (i.e. moiety IV) is a symmetrical dicarboxy aryl moiety of the formula

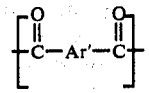

where Ar' is a divalent radical comprising at least one aromatic ring. Moiety IV is symmetrical in the sense that the divalent bonds which join the moiety to other moieties in the main polymer chain are symmetrically disposed on one or more aromatic rings (e.g. are para to each other or diagonally disposed when present on a naphthalene ring). Moiety IV comprises in excess of 5 up to approximately 30 mole percent of the aromatic polyester, and preferably approximately 15 to 25 mole percent, and most preferably approximately 20 mole percent. Preferred moieties which may serve as the symmetrical dicarboxy aryl moiety in the aromatic polyester of the present invention include:

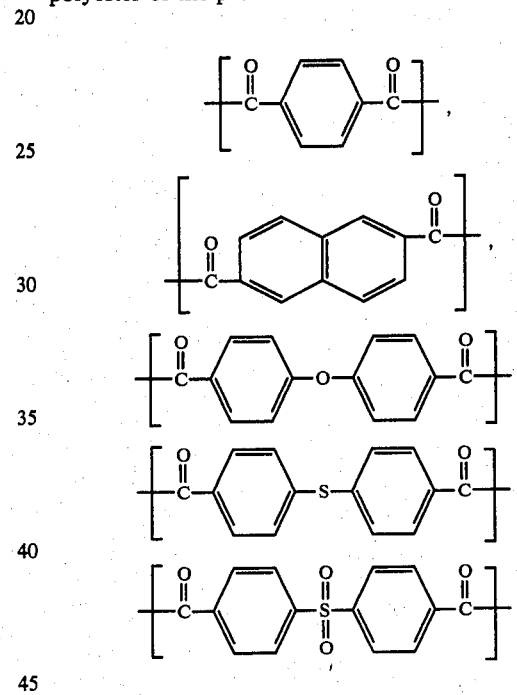

and mixtures of the foregoing.

The particularly preferred symmetrical dicarboxy aryl moiety is:

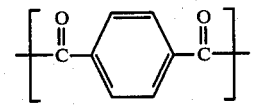

which readily may be derived from terephthalic acid.

Other aryl ester-forming moieties (e.g. dicarboxy units, dioxy units and/or other combined oxy and carboxy units) other than moieties I, II, III and IV additionally may be included in the wholly aromatic polyester of the present invention in a minor concentration (e.g. up to about 10 mole percent) so long as such moieties do not adversely influence the desired anisotropic melt phase exhibited by the polyester heretofore defined and do not raise the melting point of the resulting polymer above that specified. As will be apparent to those skilled in the art, the total molar quantities of dioxy units and dicarboxy units present within the wholly aromatic polyester will be substantially equal. Additionally, a minor quantity of another moiety derived from an aromatic hydroxy acid such as metaoxybenzoyl moiety which is derived from m-hydroxy benzoic acid optionally may be included in the wholly aromatic polyester together with moieties I, II, III, and IV. This component has the propensity to soften the polymer and reduce or eliminate high order crystallinity thus increasing the amorphous nature of the polymer. In a preferred embodiment the wholly aromatic polyester is formed solely of moieties I, II, III and IV.

The wholly aromatic polyester of the present invention commonly exhibits

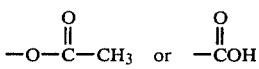

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

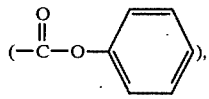

and methylester

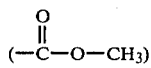

optionally may be included at the end of the polymer chains. The polymer also may be oxidatively cross-linked to at least some degree, if desired, by heating in a oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluroisopropanol and o-chlorophenol, and accordingly are not susceptible to solution processing. They can surprisingly be readily processed by common melt processing techniques as discussed hereafter. Most compositions are soluble in pentafluorophenol.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 2.5, and preferably at least approximately 3.5 (e.g., approximately 3.5 to 7.5) when dissolved in a concentration of 0.1 percent by weight in pentafluorophenol at 60° C.

The wholly aromatic polyesters of the present invention commonly may be considered crystalline in the sense that fibers melt extruded therefrom exhibit x-ray diffraction patterns using Ni-filtered CuKα radiation and flat plate cameras characteristic of polymeric crystalline materials. In those embodiments wherein aromatic ring substitution is present as previously described the polyesters may be substantially less crystalline in the solid phase and exhibit diffraction patterns typical of oriented amorphous fibers. In spite of the crystallinity commonly observed, the wholly aromatic polyester of the present invention nevertheless may be easily melt processed in all instances.

Unlike the aromatic polyesters commonly encountered in much of the prior art, the wholly aromatic polyester of the present invention is not intractable and forms an anisotropic melt phase whereby an atypical degree of order is manifest in the molten polymer. The subject polyester readily forms liquid crystals in the melt phase and accordingly exhibit a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants wherein reactants such as terephthalic acid initially are present as solids with the reaction continuing as solid polymer particles are formed and suspended therein. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the wholly aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which the 6-oxy-2-naphthoyl moiety (i.e., moiety I), the p-oxybenzoyl moiety (i.e., moiety II), and the symmetrical dioxy aryl moiety (i.e., moiety III), are derived may be initially provided in a modified form whereby the usual hydroxyl groups of these monomers are esterified (i.e., they are provided as acyl esters). For instance, lower acyl esters of 6-hydroxy-2-napthoic acid, p-hydroxy benzoic acid, and hydroquinone, wherein the hydroxy groups are esterified may be provided as reactants. The lower acyl groups preferably have from about 2 to about 4 carbon atoms. Preferably the acetate esters of the organic compounds which form moieties I, II, and III are provided. Accordingly, particularly preferred reactants for the condensation reaction are 6-acetoxy-2-naphthoic acid, p-acetoxybenzoic acid, and hydroquinone diacetate. If minor quantities of other aryl reactants (as previously discussed) optionally provide oxy-units within the resulting polymer, these too preferably are provided as the corresponding lower acyl esters.

Representative catalysts which optionally may be employed in either the melt hydrolysis procedure or in the procedure of U.S. Pat. No. 4,067,852 include dialkyl tin oxide (.e., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g. in a nitrogen atmosphere at a temperature of about 260° C. for 10 to 12 hours).

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques by utilized. Fibers or films may be melt extruded.

A molding compound may be formed from the wholly aromatic polyester of the present invention which incorporates approximately 1 to 60 percent by weight of a solid filler (e.g. talc) and/or reinforcing agent (e.g. glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 miles) may be utilized. Yarns of about 20 to 200 continuous filaments are commonly formed. The melt-spinnable wholly aromatic polyester is supplied to the extrusion orifice at a temperature above its melting point, e.g., a temperature of about 280° to 320° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, heliumor steam) or in a flowing oxygen-containing atmosphere (e.g. air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 15° to 20° C. below the temperature at which it melts for about 28 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and average single filament tensile modulus of at least about 300 grams per denier (e.g., about 300 to 1000 grams per denier), and exhibit an extraordinary dimensional stability at elevated stemperature (e.g., at temperatures of about 150° to 200° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g. 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following example is presented as a specific illustration of the claimed invention. It should be understood, however, that the invention is not limited to the specific details set forth in the example.

EXAMPLE

To a three-neck, round bottom flask equipped with a stirrer, nitrogen inlet tube and a distillation head connected to a condenser were added the following:
(a) 35.47 grams of 6-acetoxy-2-naphthoic acid (0.154 mole),
(b) 37.04 grams of p-acetoxybenzoic acid (0.206 mole),
(c) 23.28 grams of hydroquinone diacetate (0.120 mole), and
(d) 19.92 grams of terephthalic acid (0.120 mole).

After a three cycle nitrogen/vacuum purge, this mixture was brought to a temperature of 250° to 255° C. and stirred for 10 minutes. The bath temperature was then gradually increased to 310° C. over a period of 5.5 hours while acetic acid was distilled from the polymerization vessel. The polymerization melt was rapidly stirred under a slow nitrogen flow for an additional 2 hours at 310° C. and then subjected to a series of reduced pressure stages. The nitrogen flow was halted and the pressure was reduced to about 690 mm. of mercury for about 1 hour. The pressure was next reduced to 0.02–0.1 mm. of mercury and the viscous melt stirred for 5.5 hours at 300° to 310° C. During these stages the polymer melt continued to increase in viscosity and was stirred more slowly while the remaining acetic acid was removed from the reaction vessel. The polymer was then allowed to cool to ambient temperature (i.e., about 25° C.). Upon cooling, the polymer plug is finely ground in a Wiley Mill and dried in a forced air oven at 110° C. for 60 to 70 minutes.

About 65 grams of polymer were obtained. The inherent viscosity (I.V.) of the polymer was approximately 3.9 as determined in pentafluorophenol solution of 0.1 percent by weight concentration at 60° C.

$$I.V. = \frac{\ln (\eta\ rel)}{c}$$

where c=concentration of solution (0.1 percent by weight), and rel=relative viscosity. When the polymer was subjected to differential scanning calorimetry (20° C./min. heating rate), it exhibited a melt endotherm at about 273° C. The polymer melt was optically anisotropic.

The polymer was melt extruded into a continuous filament of about 10 denier per filament. More specifically, the polymer melt while at a temperature of about 290° C. was extruded through a spinneret provided with a single hole jet having a diameter of 9 mils. The extruded filament was quenched in ambient air (i.e., at 72° F. and 65 percent relative humidity). The as-spun filament was taken-up at a rate of 500 meters per minute.

The resulting as-spun wholly aromatic polyester fiber exhibited the following average single filament properties:
Tenacity (grams per denier): 6.4
Tensile modulus (grams per denier): 442
Elongation (percent): 1.5 Following thermal treatment in a nitrogen stream at 250° C. for 90 hours while the ends of the fiber were retained at fixed points, the fiber showed the following average single filament properties:
Tenacity (grams per denier): 15.5
Tensile modulus (grams per denier): 469
Elongation (percent): 3.1 The fiber also exhibited a low degree of shrinkage at elevated temperatures and a good retention of tenacity and tensile modulus values at temperatures up to about 150° to 200° C.

Although the invention has been described with a preferred embodiment it is to be understood that variations and modifications may be employed without departing from the concept of the invention as defined in the following claims.

I claim:

1. A melt processable wholly aromatic polyester capable of forming an anisotropic melt phase at a temperature below approximately 320° C. consisting essentially of the recurring moieties I, II, III, and IV which may include substitution of at least some of the hydrogen atoms present upon an aromatic ring wherein:

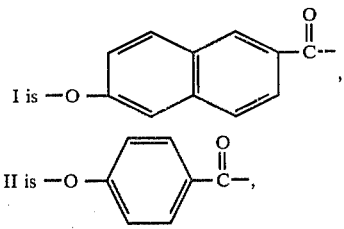

III is a symmetrical dioxy aryl moiety of the formula
—[O—Ar—O]— where Ar is a divalent radical comprising at least one aromatic ring, and IV is symmetrical a dicarboxy aryl moiety of the formula

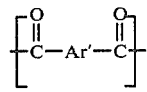

where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 20 to 40 mole percent of moiety I, approximately 10 up to 50 mole percent of moiety II, in excess of 5 up to approximately 30 mole percent of moiety III, and in excess of 5 up to approximately 30 mole percent of moiety IV.

2. A melt processable wholly aromatic polyester according to claim 1 which is capable of forming an anisotropic melt phase at a temperature below approximately 300° C.

3. A melt processable wholly aromatic polyester according to claim 1 which is capable of exhibiting a differential scanning calorimeter melting temperature in the range of 270° to 280° C.

4. A melt processable wholly aromatic polyester according to claim 1 which is capable of undergoing melt processing at a temperature in the range of approximately 280° to 300° C.

5. A melt processable wholly aromatic polyester according to claim 1 which consists essentially of approximately 20 to 30 mole percent of moiety I, approximately 25 to 40 mole percent of moiety II, approximately 15 to 25 mole percent of moiety III, and approximately 15 to 25 mole percent of moiety IV.

6. A melt processable wholly aromatic polyester according to claim 1 wherein each moiety is substantially free of ring substitution.

7. A melt processable wholly aromatic polyester according to claim 1 wherein said symmetrical dioxy aryl moiety III is selected from the group consisting of:

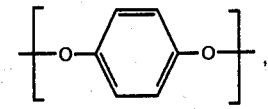

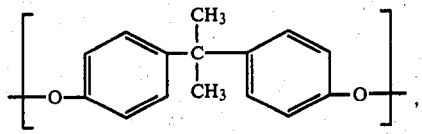

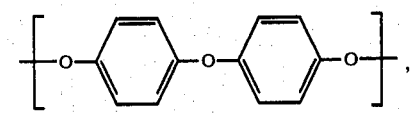

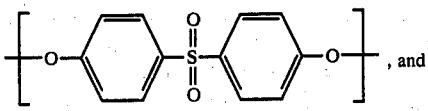

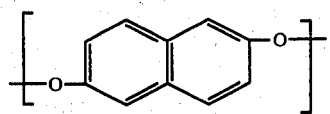

and mixtures of the foregoing.

8. A melt processable wholly aromatic polyester according to claim 1 wherein said symmetrical dicarboxy aryl moiety IV is selected from the group consisting of:

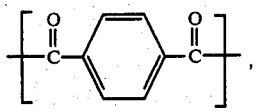

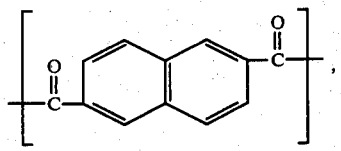

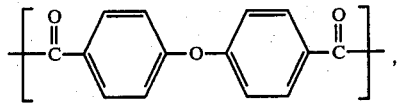

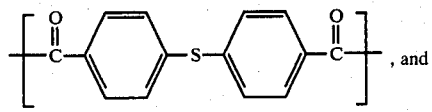

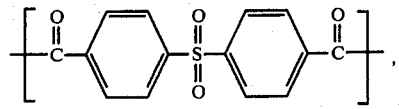

and mixtures of the foregoing.

9. A melt processable wholly aromatic polyester according to claim 1 which exhibits an inherent viscosity of at least 2.5 when dissolved in a concentration of 0.1 percent by weight in pentafluorophenol at 60° C.

10. A melt processable wholly aromatic polyester according to claim 1 which exhibits an inherent viscosity of at least 3.5 when dissolved in a concentration of 0.1 percent by weight in pentafluorophenol at 60° C.

11. A melt processable wholly aromatic polyester according to claim 1 which exhibits an inherent viscosity of 3.5 to 7.5 when dissolved in a concentration of 0.1 percent by weight in pentafluorophenol at 60° C.

12. A fiber which has been melt spun from the wholly aromatic polyester of claim 1.

13. A film which has been melt extruded from the wholly aromatic polyester of claim 1.

14. A molded article comprising the melt processable wholly aromatic polyester of claim 1.

15. A molding compound comprising the melt processable wholly aromatic polyester of claim 1 which incorporates approximately 1 to 60 percent by weight of a solid filler and/or reinforcing agent.

16. A melt processable wholly aromatic polyester capable of forming an anisotropic melt phase at a temperature below approximately 320° C. consisting essentially of the recurring moieties I, II, III, and IV which may include substitution of at least some of the hydrogen atoms present upon an aromatic ring wherein:

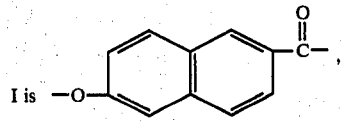

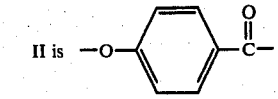

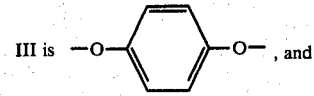

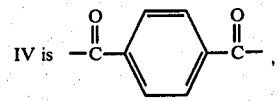

with said optional substitution if present being selected from the group consisting of an alkyl group of 1 to 4 carbon atoms, an alkoxy group of 1 to 4 carbon atoms, halogen, and mixtures of the foregoing, and wherein said polyester comprises approximately 20 to 40 mole percent of moiety I, approximately 10 to 50 mole percent of moiety II, in excess of 5 up to approximately 30 mole percent of moiety III, and in excess of 5 up to approximately 30 mole percent of moiety IV.

17. A melt processable wholly aromatic polyester according to claim 16 which is capable of forming an anisotropic melt phase at a temperature below approximately 300° C.

18. A melt processable wholly aromatic polyester according to claim 16 which is capable of exhibiting a differential scanning calorimeter melting temperature in the range of 270° to 280° C.

19. A melt processable wholly aromatic polyester according to claim 16 which is capable of undergoing melt processing at a temperature in the range of approximately 280° to 300° C.

20. A melt processable wholly aromatic polyester according to claim 16 which consists essentially of approximately 20 to 30 mole percent of moiety I, approximately 25 to 40 mole percent of moiety II, approximately 15 to 25 mole percent of moiety III, and approximately 15 to 25 mole percent of moiety IV.

21. A melt processable wholly aromatic polyester according to claim 16 wherein each moiety is substantially free of ring substitution.

22. A melt processable wholly aromatic polyester according to claim 16 which exhibits an inherent viscosity of at least 2.5 when dissolved in a concentration of 0.1 percent by weight of pentafluorophenol at 60° C.

23. A melt processable wholly aromatic polyester according to claim 16 which exhibits an inherent viscosity of at least 3.5 when dissolved in a concentration of 0.1 percent by weight in pentafluorophenol at 60° C.

24. A melt processable wholly aromatic polyester according to claim 16 which exhibits an inherent viscosity of 3.5 to 7.5 when dissolved in a concentration of 0.1 percent by weight in pentafluorophenol at 60° C.

25. A fiber which has been melt spun from the wholly aromatic polyester of claim 16.

26. A film which has been melt extruded from the wholly aromatic polyester of claim 16.

27. A molded article comprising the melt processable wholly aromatic polyester of claim 16.

28. A molding compound comprising the melt processable wholly aromatic polyester of claim 16 which incorporates approximately 1 to 60 percent by weight of a solid filler and/or reinforcing agent.

29. A melt processable wholly aromatic polyester capable of forming an anisotropic melt phase at a temperature below approximately 320° C. consisting essentially of the recurring moieties I, II, III, and IV wherein:

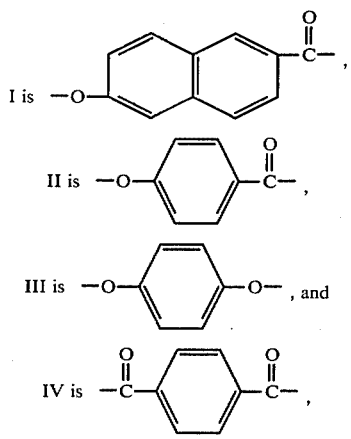

and wherein said polyester comprises approximately 20 to 40 mole percent of moiety I, approximately 10 to 50 mole percent of moiety II, in excess of 5 up to approximately 30 mole percent of moiety III, and in excess of 5 up to approximately 30 mole percent of moiety IV.

30. A melt processable wholly aromatic polyester according to claim 29 which is capable of forming an anisotropic melt phase at a temperature below approximately 300° C.

31. A melt processable wholly aromatic polyester according to claim 29 which is capable of exhibiting a differential scanning calorimeter melting temperature in the range of 270° to 280° C.

32. A melt processable wholly aromatic polyester according to claim 29 which is capable of undergoing melt processing at a temperature in the range of approximately 280° to 300° C.

33. A melt processable wholly aromatic polyester according to claim 29 which consists essentially of approximately 20 to 30 mole percent of moiety I, approximately 25 to 40 mole percent of moiety II, approximately 15 to 25 mole percent of moiety III, and approximately 15 to 25 mole percent of moiety IV.

34. A melt processable wholly aromatic polyester according to claim 29 which consists essentially of approximately 25 mole percent of moiety I, approximately 35 mole percent of moiety II, approximately 20 mole percent of moiety III, and approximately 20 mole percent of moiety IV.

35. A melt processable wholly aromatic polyester according to claim 29 wherein each moiety is substantially free of ring substitution.

36. A melt processable wholly aromatic polyester according to claim 29 which exhibits an inherent viscosity of at least 2.5 when dissolved in a concentration of 0.1 percent by weight in pentafluorophenol at 60° C.

37. A melt processable wholly aromatic polyester according to claim 29 which exhibits an inherent viscosity of at least 3.5 when dissolved in a concentration of 0.1 percent by weight in pentafluorophenol at 60° C.

38. A melt processable wholly aromatic polyester according to claim 29 which exhibits an inherent viscosity of 3.5 to 7.5 when dissolved in a concentration of 0.1 percent by weight in pentafluorophenol at 60° C.

39. A fiber which has been melt spun from the wholly aromatic polyester of claim 29.

40. A film which has been melt extruded from the wholly aromatic polyester of claim 29.

41. A molded article comprising the melt processable wholly aromatic polyester of claim 29.

42. A molding compound comprising the melt processable wholly aromatic polyester of claim 29 which incorporates approximately 1 to 60 percent by weight of a solid filler and/or reinforcing agent.

* * * * *